United States Patent
Goldberg et al.

(10) Patent No.: US 7,603,229 B2
(45) Date of Patent: Oct. 13, 2009

(54) EFFICIENTLY FINDING SHORTEST PATHS USING LANDMARKS FOR COMPUTING LOWER-BOUND DISTANCE ESTIMATES

(75) Inventors: Andrew V. Goldberg, Redwood City, CA (US); Christopher Robert Harrelson, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 10/925,751

(22) Filed: Aug. 25, 2004

(65) Prior Publication Data

US 2006/0047416 A1  Mar. 2, 2006

(51) Int. Cl.
*G01C 21/34* (2006.01)
(52) U.S. Cl. .................. 701/202; 701/209; 340/995.19
(58) Field of Classification Search ......... 701/200–202, 701/208–209, 25; 340/988; 342/357.08, 342/357.09
See application file for complete search history.

(56) References Cited

U.S. PATENT DOCUMENTS

| | | | |
|---|---|---|---|
| 6,021,372 A | | 2/2000 | Harrington |
| 6,311,125 B1 | | 10/2001 | Okano et al. |
| 6,526,350 B2 | * | 2/2003 | Sekiyama ................. 701/209 |
| 6,559,794 B1 | * | 5/2003 | Nakajima et al. ...... 342/357.06 |
| 6,615,133 B2 | | 9/2003 | Boies et al. |
| 6,785,608 B1 | * | 8/2004 | Milici et al. ................. 701/209 |

OTHER PUBLICATIONS

B. V. Cherkassky, A. V. Goldberg, and T. Radzik. Shortest Paths Algorithms: Theory and Experimental Evaluation. In *Proc. 5th ACM-SIAM Symposium on Discrete Algorithms*, pp. 516-525, 1994.
T. H. Cormen, C. E. Leiserson, and R. L. Rivest. *Introduction to Algorithms.* MIT Press, Cambridge, MA, pp. 514-549, 1990.
L. J. Cowen and C. G. Wagner. Compact Roundtrip Routing in Directed Networks. In *Proc. Symp. on Principles of Distributed Computation*, pp. 51-59, 2000.
G. B. Dantzig. *Linear Programming and Extensions.* Princeton Univ. Press, Princeton, NJ, 1962, chapters 17-19.
D. de Champeaux. Bidirectional Heuristic Search Again. *J. ACM*, 30(1):22-32, 1983.
E. V. Denardo and B. L. Fox. Shortest-Route Methods: 1. Reaching, Pruning, and Buckets. *Oper. Res.*, 27:161-186, 1979.
E. W. Dijkstra. A Note on Two Problems in Connexion with Graphs. *Numer. Math.*, 1:269-271, 1959.
J. Doran. An Approach to Automatic Problem-Solving. Machine Intelligence, 1:105-123, 1967.
D. Dreyfus. An Appraisal of Some Shortest Path Algorithms. Technical Report RM-5433, Rand Corporation, Santa Monica, CA, 1967.

(Continued)

*Primary Examiner*—Yonel Beaulieu
(74) *Attorney, Agent, or Firm*—Woodcock Washburn LLP

(57) ABSTRACT

Methods and systems are described for computing shortest paths among a set of locations. A small set of landmarks is chosen and the distance between each location and each landmark is computed and stored. Given source and destination locations, the landmark distances are used to compute lower-bound estimates of distances from locations to the destination. The estimates are then used with a heuristic search to find the shortest path from source to destination.

23 Claims, 9 Drawing Sheets

OTHER PUBLICATIONS

J. Fakcharoenphol and S. Rao. Planar graphs, negative weight edges, shortest paths, and near linear time. In *Proc. 42nd IEEE Annual Symposium on Foundations of Computer Science*, pp. 232-241, 2001.

L.R. Ford Jr., and D. R. Fulkerson, *Flows in Networks*. Princeton Univ. Press, Princeton, NJ, 1962, pp. 130-137.

M. L. Fredman and R. E. Tarjan. Fibonacci Heaps and Their Uses in Improved Network Optimization Algorithms. *J. Assoc. Comput. Mach.*, 34:596-615, 1987.

G. Gallo and S. Pallottino. Shortest Paths Algorithms. *Annals of Oper. Res.*, 13:3-79, 1988.

A. V. Goldberg. A Simple Shortest Path Algorithm with Linear Average Time. In *Proc. 9th ESA, Lecture Notes in Computer Science LNCS 2161*, pp. 230-241. Springer-Verlag, 2001.

A. V. Goldberg. Shortest Path Algorithms: Engineering Aspects, In *Proc. ESAAC '01, Lecture Notes in Computer Science*. Springer-Verlag, 2001.

A. V. Goldberg and C. Harrelson. Computing the Shortest Path: A Search Meets Graph Theory. Technical Report MSR-TR-2004-24, Microsoft Corp., Redmond, WA, 2004.

A. V. Goldberg and C. Silverstein. Implementations of Dijkstra's Algorithm Based on Multi-Level Buckets. In P. M. Pardalos, D. W. Hearn, and W. W. Hages, editors, *Lecture Notes in Economics and Mathematical Systems 450 (Refereed Proceedings)*, pp. 292-327. Springer Verlag, 1997.

R. Gutman. Reach-based routing: A new approach to shortest path algorithms optimized for road networks. In *Proc. Algorithm engineering and experimentation: sixth annual international workshop*, 2004.

P. E. Hart, N. J. Nilsson, and B. Raphael. A Formal Basis for the Heuristic Determination of Minimum Cost Paths. *IEEE Transactions on System Science and Cybernetics*, SSC-4(2), 1968.

T. Ikeda, Min-Yao Hsu, H. Imai, S. Nishimura, H. Shimoura, T. Hashimoto, K. Tenmoku, and K. Mitoh. A Fast Algorithm for Finding Better Routes by AI Search Techniques. In *Proc. Vehicle Navigation and Information Systems Conference*. IEEE, 1994.

R. Jacob, M.V. Marathe, K. Nagel. A Computational Study of Routing Algorithms for Realistic Transportation Networks. Tech. Rep. LA-UR-98-2249, Los Alamos Nat'l Lab., 1999.

P. Klein. Preprocessing an Undirected Planar Network to Enable Fast Approximate Distance Queries. In *SODA*, pp. 820-827, 2002.

J.B.H. Kwa. BS: An Admissible Bidirectional Staged Heuristic Search Algorithm. *Artif. Intell.*, 38(1):95-109, 1989.

U. Meyer. Single-Source Shortest Paths on Arbitrary Directed Graphs in Linear Average Time. In *Proc. 12th ACM-SIAM Symposium on Discrete Algorithms*, pp. 797-806, 2001.

T. A. J. Nicholson. Finding the Shortest Route Between Two Points in a Network. *Computer J.*, 9:275-280, 1966.

S. Pallottino and M. G. Scutell. A New Algorithm for Reoptimizing Shortest Paths when the Arc Costs Change. *Networks*, 31:149-160, 2003.

I. Pohl. Bi-directional Search. In *Machine Intelligence*, vol. 6, pp. 124-140. Edinburgh Univ. Press, Edinburgh, 1971.

F. Schulz, D. Wagner, and C. Zaroliagis. Using Multi-Level Graphs for Timetable Information in Railway Systems. In *Proc. Algorithm Engineering and Exteriments*, pp. 43-59. LNCS, Springer, 2002.

R. Sedgewick and J.S. Vitter. Shortest Paths in Euclidean Graphs. *Algorithmica*, 1:31-48, 1986.

L. Sint and D. de Champeaux. An Improved Bidirectional Heuristic Search Algorithm, J.*ACM*, 24(2):177-191, 1977.

R. E. Tarjan. *Data Structures and Network Algorithms*. Society for Industrial and Applied Mathematics, Philadelphia, PA, 1983.

M. Thorup. Undirected Single-Source Shortest Paths with Positive Integer Weights in Linear Time. *J. Assoc. Comput. Mach.*, 46:362-394, 1999.

M. Thorup. Compact Oracles for Reachability and Approximate Distances in Planar Digraphs. In *Proc. 42nd IEEE Annual Symposium on Foundations of Computer Science*, pp. 242-251, 2001.

D. Wagner and T. Willhalm. Geometric Speed-Up Techniques for Finding Shortest Paths in Large Sparse Graphs. In *European Symposium on Algorithms*, 2003.

F. B. Zhan and C. E. Noon. Shortest Path Algorithms: An Evaluation using Real Road Networks, *Transp. Sci.*, 32:65-73, 1998.

F. B. Zhan and C. E. Noon. A Comparison Between Label-Setting and Label-Correcting Algorithms for Computing One-to-One Shortest Paths. *Journal of Geographic Information and Decision Analysis*, 4, 2000.

\* cited by examiner

EFFICIENTLY FINDING SHORTEST PATHS USING LANDMARKS FOR COMPUTING LOWER-BOUND DISTANCE ESTIMATES

FIELD OF THE INVENTION

This invention pertains generally to the field of routing and more particularly to calculating a best route between two points on a computerized map.

BACKGROUND OF THE INVENTION

Existing computer programs known as "road-mapping" programs provide digital maps, often complete with detailed road networks down to the city-street level. Typically, a user can input a location and the road-mapping program will display an on-screen map of the selected location. Several existing road-mapping products typically include the ability to calculate a "best route" between two locations. In other words, the user can input two locations, and the road-mapping program will compute the travel directions from the source location to the destination location. The directions are typically based on distance, travel time, and certain user preferences, such as a speed at which the user likes to drive, or the degree of scenery along the route. Computing the best-route between locations may require significant computational time and resources.

Existing road-mapping programs employ variants of a method attributed to E. Dijkstra to compute shortest paths. Dijkstra's method is described by Cormen, Leiserson and Rivest in *Introduction to Algorithms*, MIT Press, 1990, pp. 514-531, which is hereby incorporated by reference in its entirety for all that it teaches without exclusion of any part thereof. Note that in this sense "shortest" means "least cost" because each road segment is assigned a cost or weight not necessarily directly related to the road segment's length. By varying the way the cost is calculated for each road, shortest paths can be generated for the quickest, shortest, or preferred routes.

Dijkstra's original method, however, is not always efficient in practice, due to the large number of locations and possible paths that are scanned. Instead, many modern road-mapping programs use heuristic variations of Dijkstra's method, including A* search (i.e., heuristic or goal-directed search) in order to "guide" the shortest-path computation in the right general direction. Such heuristic variations typically involve estimating the weights of paths between intermediate locations and the destination. A good estimate reduces the number of locations and road segments that must be considered by the road-mapping program, resulting in a faster computation of shortest paths; a bad estimate can have the opposite effect, and increase the overall time required to compute shortest paths. If the estimate is a lower-bound on distances with certain properties, A* search computes the optimal (shortest) path. The closer these lower-bounds are to the actual path weights, the better the estimation and the algorithm performance. Lower-bounds that are very close to the actual values being bound are said to be "good." Previously known heuristic variations use lower-bound estimation techniques such as Euclidean distance (i.e., "as the crow flies") between locations, which are not very good.

BRIEF SUMMARY OF THE INVENTION

Methods and systems are provided for computing shortest paths among a set of locations. A small set of landmarks is chosen and the distance between each location and each landmark is computed and stored. Given source and destination locations, the landmark distances are used to compute lower-bound estimates of distances from locations to the destination. The estimates are then used with a heuristic search to find the shortest path from source to destination. Additional improvements are provided to reduce the amount of storage required.

In one aspect, a computer-readable medium is provided including computer-executable instructions facilitating the finding of a shortest path from a starting location to a destination location among a set of locations, the computer-executable instructions performing the step of estimating distances to the destination location from locations in the set of locations by using distances between the locations and one or more landmarks from a set of landmarks.

In another aspect, a computer-readable medium is provided for use in finding a shortest path from a starting location to a destination location among a set of locations, the computer-readable medium including computer-executable instructions facilitating the estimating the distance from a first location to the destination location, the computer-executable instructions performing the steps of computing a first distance from the first location to a landmark, computing a second distance from the destination location to the landmark, and calculating a first difference between the first distance and the second distance for estimating the distance from the first location to the destination location.

In still another aspect, a method of finding a shortest path from a starting location to a destination location among a set of locations is provided, the method comprising estimating distances to the destination location from locations in the set of locations by using distances between the locations and one or more landmarks from a set of landmarks.

In yet another aspect, a method is provided for use in finding a shortest path from a starting location to a destination location among a set of locations, the method estimating the distance from a first location to the destination location, the method comprising computing a first distance from the first location to a landmark, computing a second distance from the destination location to the landmark, and calculating a first difference between the first distance and the second distance for estimating the distance from the first location to the destination location.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The methods and systems to compute shortest paths using landmarks to estimate distances will now be described with respect to preferred embodiments; however, the methods and systems of the present invention are not limited to computing shortest paths. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
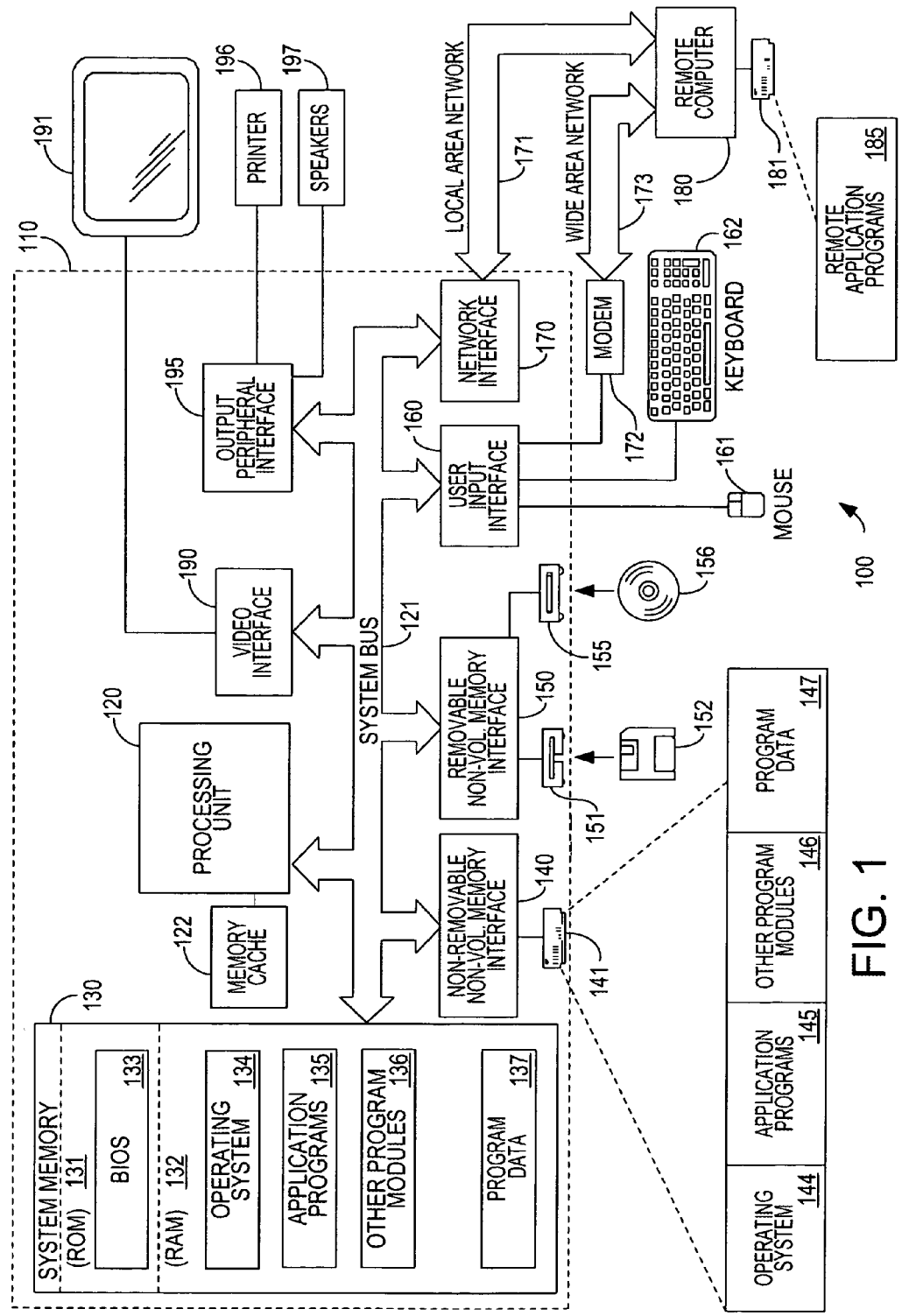
FIG. 1 is a simplified schematic illustrating an exemplary architecture of a computing environment on which shortest paths can be calculated, in accordance with an embodiment of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes nonessential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Additionally, components of the computer 110 may include a memory cache 122. The processing unit 120 may access data from the memory cache more quickly than from the system memory 130. The memory cache 122 typically stores the data most recently accessed from the system memory 130 or most recently processed by the processing unit 120. The processing unit 120, prior to retrieving data from the system memory 130, may check if that data is currently stored in the memory cache 122. If so, a "cache hit" results and the data is retrieved from the memory cache 122 rather than from the generally slower system memory 130.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
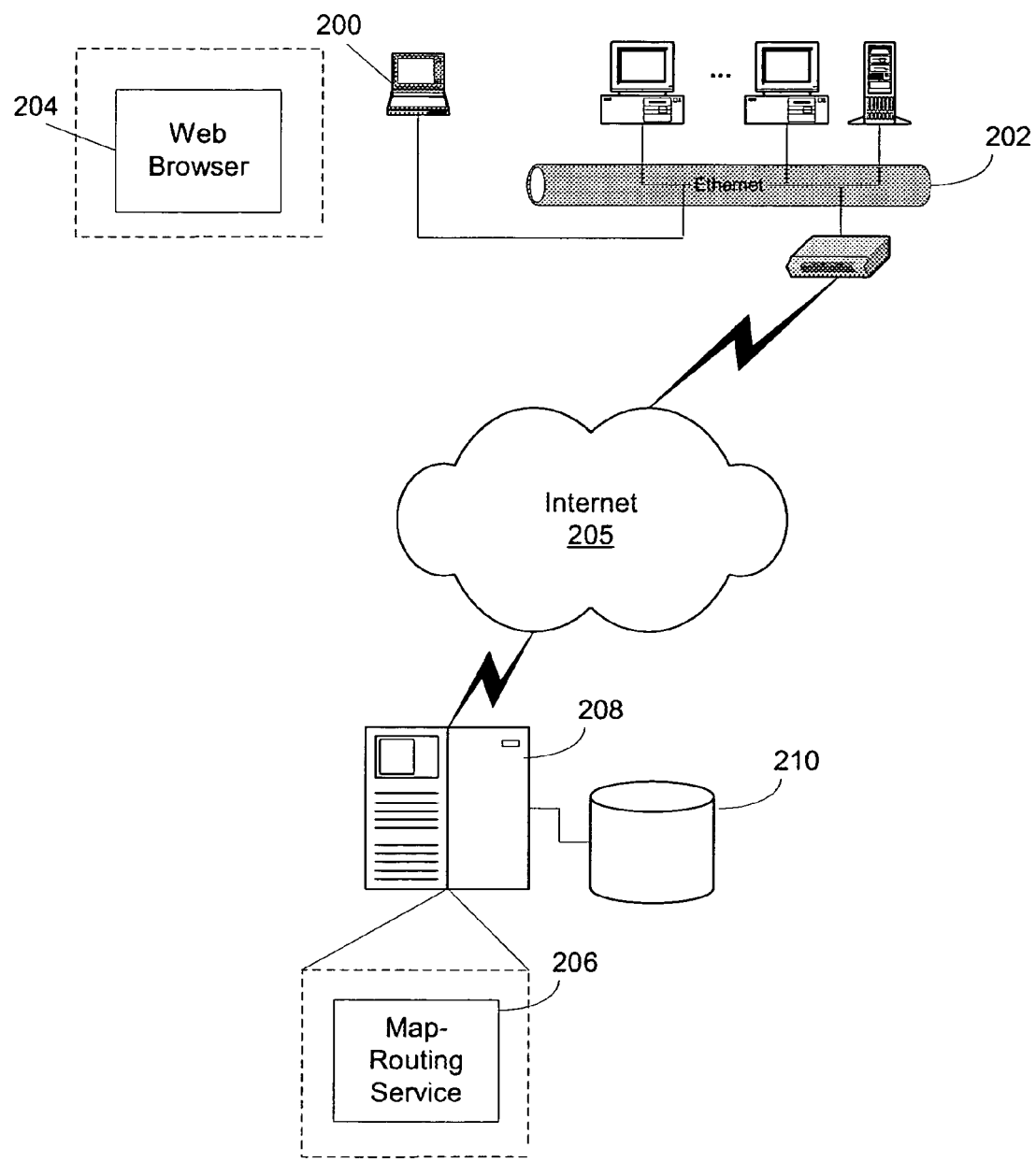
FIG. 2 is a diagram illustrating an arrangement of computing devices on a computing network, in accordance with an embodiment of the invention.

Turning to FIG. 2, a simple example of a computing environment is depicted wherein the invention is potentially exploited. In the illustrative environment, a computing device 200 includes a network interface card (not specifically shown) facilitating communications over a communications medium. In the particular example depicted in FIG. 2, the computing device 200 communicates with a local area network 202 via physical connection. Alternatively, the computing device 200 could communicate with the local area network 202 via WWAN or WLAN media, or via other communications media. The user of the computing device 200, as a result of the supported network medium, is able to access network resources, typically through the use of a browser application 204 running on the computing device 200. The browser application 204 facilitates communication with a remote network over, for example, the Internet 205. One exemplary network resource is a map-routing service 206, running on a map-routing server 208. The map routing server 208 hosts a database 210 of physical locations and street addresses, along with routing information such as adjacencies, distances, speed limits, and other relationships between the stored locations. A user of the computing device 200 typically enters start and destination locations as a request through the browser application 204. The map-routing server 208 receives the requests and produces an optimal route among the locations stored in the database 210 for reaching the destination location from the start location. The map-routing server 208 then sends that optimal route back to the requesting computing device 200. Alternatively, the map-routing service 208 is hosted on the computing device 200, and the computing device 200 need not communicate with a local area network 202.

Figure 3:
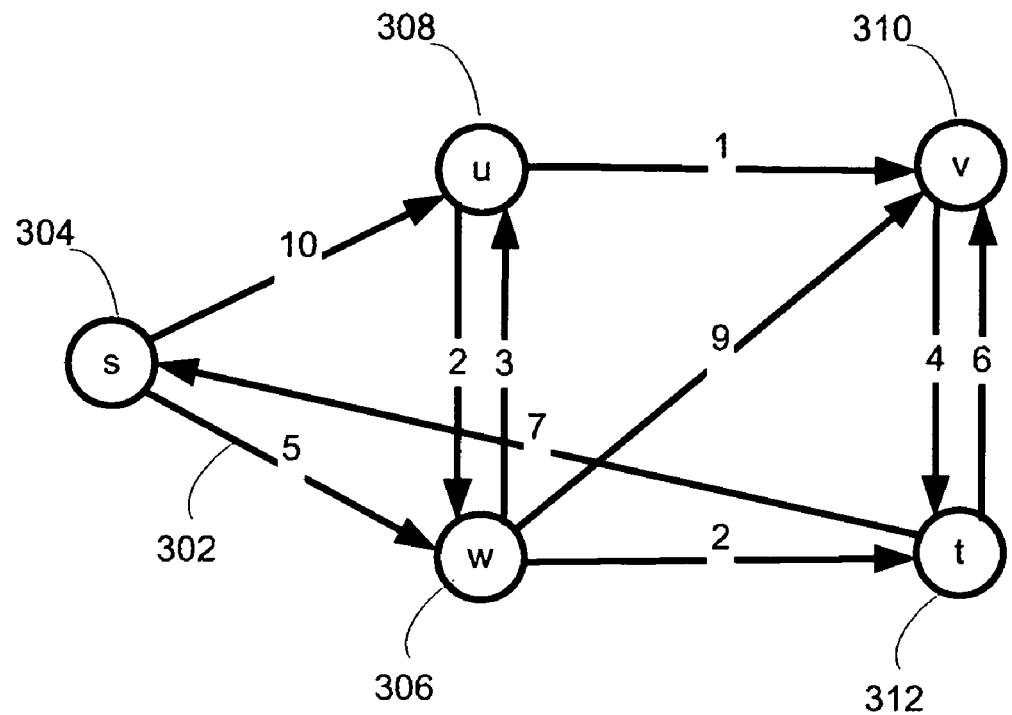
FIG. 3 is a diagram illustrating a graph representation of interconnected locations, in accordance with an embodiment of the invention.

Computing the optimal route, however, is not a trivial task. To visualize and implement routing methods, it is helpful to represent locations and connecting segments as an abstract graph with vertices and directed edges. Vertices correspond to locations, and edges correspond to road segments between locations. The edges are preferably weighted according to the travel distance, speed limit, and/or other criteria about the corresponding road segment. The general terms "length" and "distance" are used in context to encompass the metric by which an edge's weight or cost is measured. The length or distance of a path is the sum of the weights of the edges contained in the path. For example, in the graph of FIG. 3, edge (s, w) 302 going from vertex s 304 to vertex w 306 has length 5. The length of the path from s 304 to u 308 to v 310 to t 312 is 10+1+4=15. A shorter path from s 302 to t 312 is via w 306, and is of length 7. For manipulation by computing devices, graphs may be stored preferably in a contiguous block of computer memory as a collection of records, each record representing a single graph node or edge along with associated data.

One approach to computing the optimal route is to use the method of Dijkstra. In general, Dijkstra's method finds the shortest path from a single "source" vertex to all other vertices in the graph by maintaining for each vertex a distance label and a flag indicating if the vertex has yet been scanned. The distance label is initially set to infinity for each vertex, and represents the weight of the shortest path from the source to that vertex using only those vertices that have already been scanned. The method picks an unscanned vertex and relaxes all edges coming out of the vertex (i.e., leading to adjacent vertices). The straightforward implementation of Dijkstra's method chooses for scanning the unscanned vertex with the lowest distance label. To relax an edge (v, w), the method checks if the labeled distance for w is greater than the sum of the labeled distance for v and the actual weight of the edge (v, w). If so, the method updates the distance label for w to equal that sum. It can be mathematically shown that once a vertex has been scanned, its distance label does not subsequently change. Some implementations further maintain a parent label for each scanned vertex w, indicating the vertex v whose outgoing edge leads to w on the shortest path. When the method is about to scan a vertex, the path defined by the parent pointers for that vertex is a shortest path.

Figure 4:
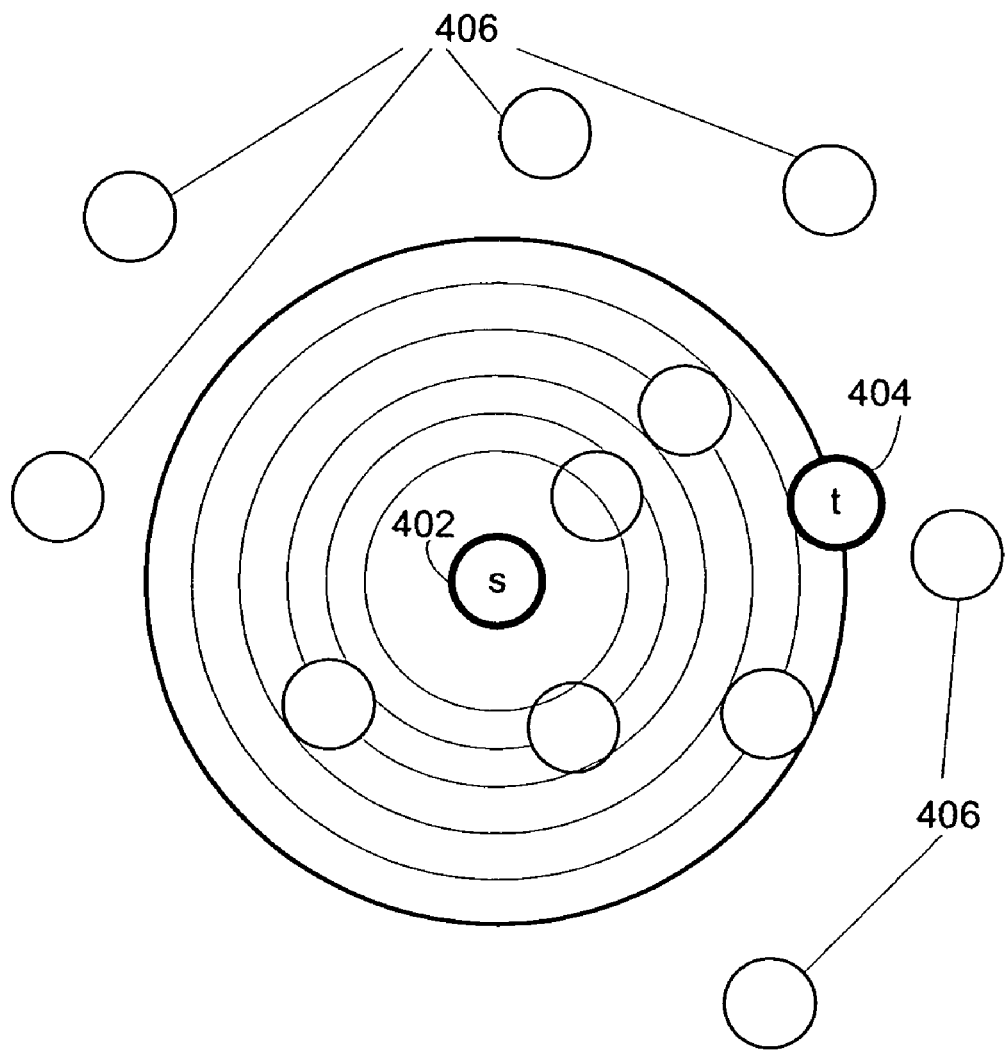
FIG. 4 is a diagram illustrating locations scanned by a shortest path searching method.

Although Dijkstra's method can be used to compute shortest paths from a source to all other vertices, it can also be used to find a shortest path from a source to a single destination vertex—the method simply terminates when the destination vertex is about to be scanned. Intuitively, Dijkstra's method searches within a circle, the source vertex in the center, increasing the radius of the circle by choosing vertices and scanning them. If a path is sought for a particular destination, the method terminates with the destination on the boundary of the circle. As illustrated in FIG. 4, searching for a shortest path from vertex s 402 to vertex t 404 via Dijkstra's method results in scanning possible vertices in increasing order of their distance from s 402. The shortest path to any vertex only passes through vertices that have already been scanned. Once the distance and shortest path to vertex t 404 have been determined, the method stops, leaving those vertices 406 who are further distance than t 404 from s 402 unscanned. At this point, in the traditional Dijkstra method, all those vertices 408 who are closer distance than t 404 from s 402 have already been scanned.

As previously noted, Dijkstra's original method is not always efficient in practice to find a shortest path from a source to a particular destination, due to the large number of locations and possible paths that are scanned. Instead, embodiments of the invention use A* searches in order to guide the shortest-path computation in the right general direction, thereby reducing the number of vertices scanned en route. The A* search operates similarly to the above-described method of Dijkstra, but additionally maintains an estimate for each vertex. The estimate is typically a lower-bound on the actual weight of a path from that vertex to the destination. To choose a labeled vertex for scanning, the A* search chooses the unscanned vertex whose sum of labeled distance and estimate is minimal. The rest of Dijktra's method remains the same. The set of estimates over the vertices form a "potential" function with respect to the destination, and the potential of a vertex is the estimate of the weight of the shortest path from the vertex to the destination.

Figure 5:
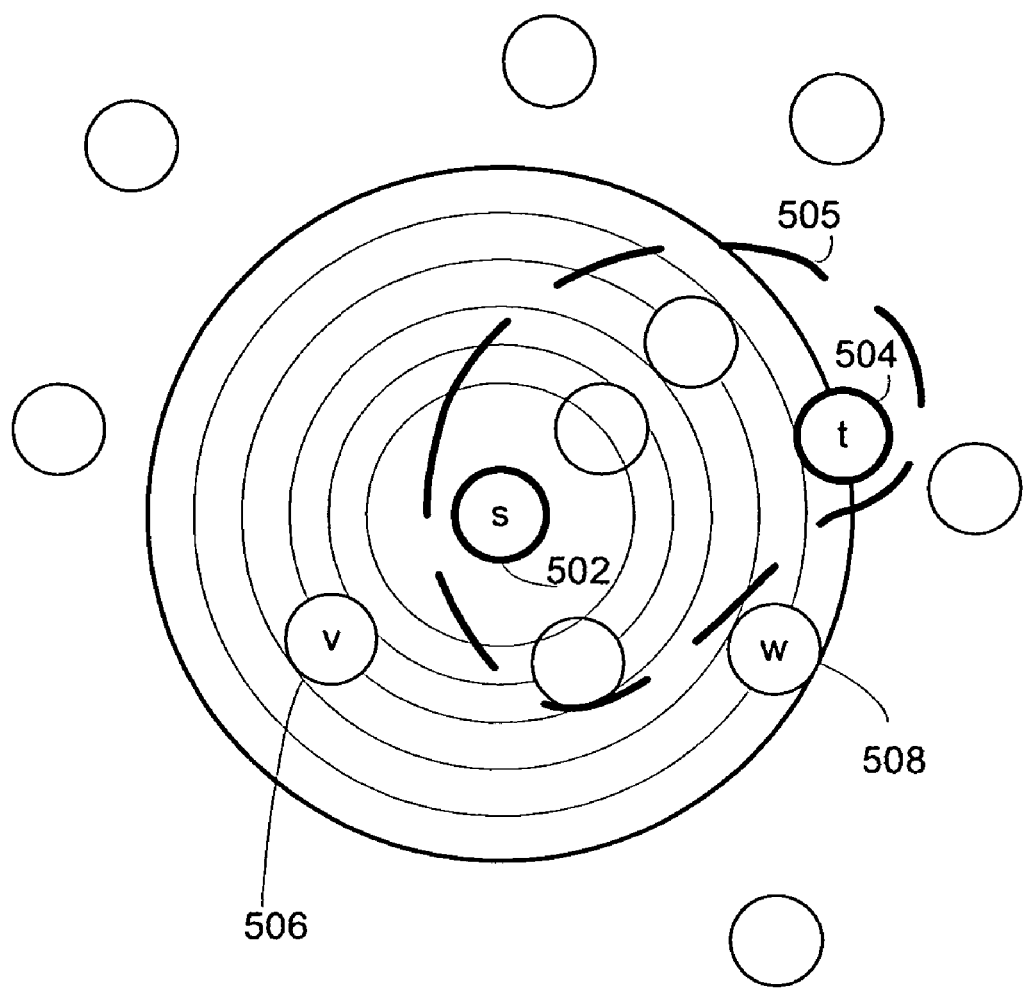
FIG. 5 is a diagram illustrating locations scanned by a heuristic shortest path searching method, in accordance with an embodiment of the invention.

In order to mathematically guarantee accurate results, such heuristic variations as those used in embodiments of the invention generally use "feasible" estimates (i.e., for an edge from v to w, the estimate for v minus the estimate for w is not more than the actual weight of the edge). A good estimate generally is a lower-bound for the actual weight of path segments, since lower-than-actual weights may force segments to be considered sooner by the road-mapping program. The closer these lower-bounds are to the actual path weights, the better the estimation. An example is shown in FIG. 5, where estimates have been used to guide the heuristic search from s 502 to t 504. The set of vertices 505 scanned by the heuristic search are those whose estimated distance to t 504 plus actual distance from s 504 is minimal. The exemplary heuristic search has saved the scanning of vertices v 506 and w 508, which would otherwise have been scanned in a straightforward application of Dijkstra's method.

Figure 6:
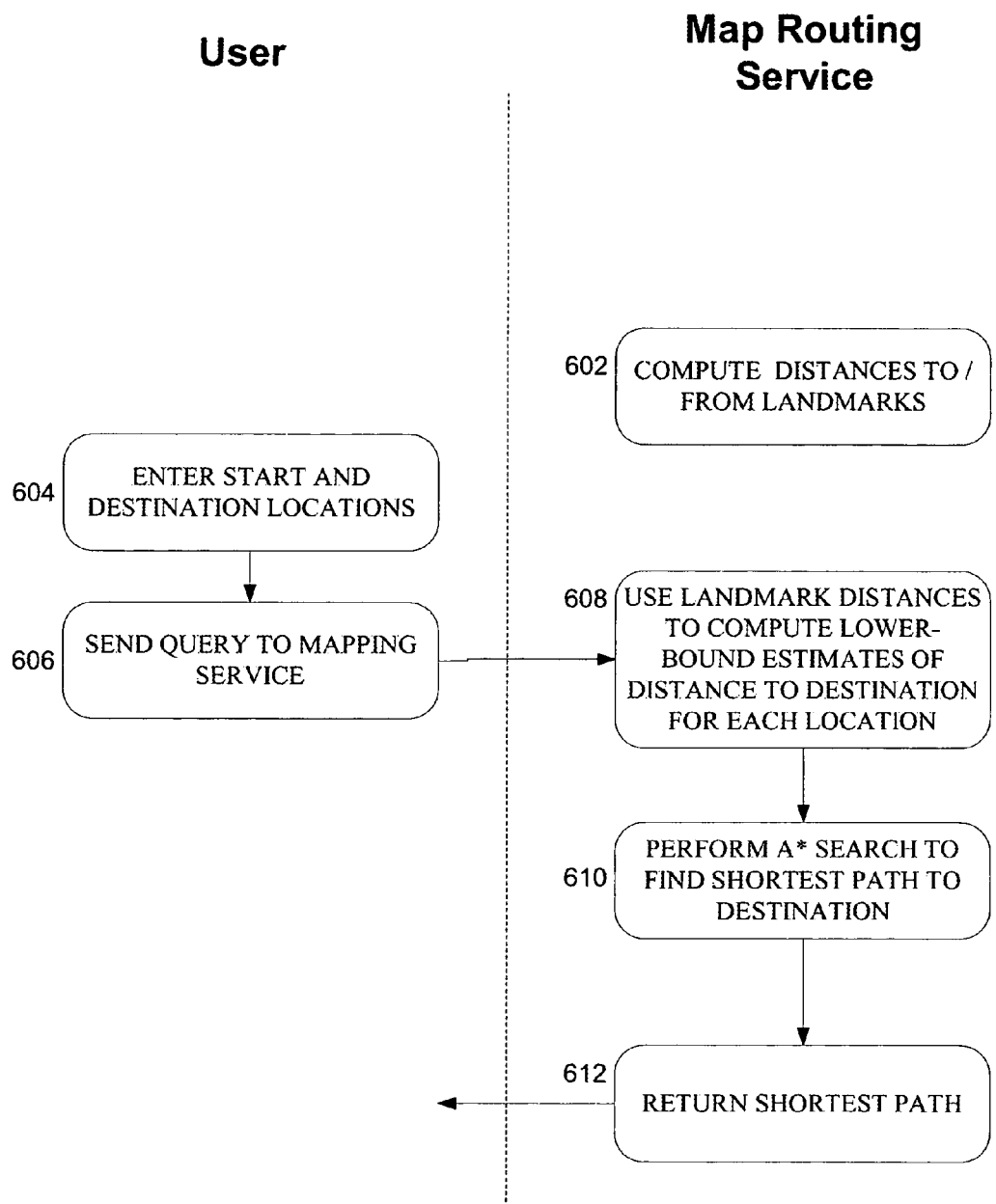
FIG. 6 is a flow diagram illustrating a method for finding the shortest path between two locations, in accordance with an embodiment of the invention.

A common technique employed by previous lower-bounding implementations uses information implicit in the domain, like Euclidean distances for Euclidean graphs, to compute lower bounds. Embodiments of the present invention instead select a small set of "landmarks" and for all vertices pre-compute distances to and from every landmark. The general technique is now described with reference to FIG. 6, in accordance with an embodiment of the invention. Actual distances to and from each landmark in the set are computed for each location (i.e., vertex in the corresponding graph) in a pre-processing step 602. A user enters start and destination locations at step 604, and the query is sent to a mapping service at step 606. The mapping service uses the distances to and from the landmarks to compute lower-bound estimates on the distances from each location to the destination location at step 608. Using the lower-bounds, the mapping service performs an A* search to find the shortest path to the destination from the source at step 610. The mapping service returns the shortest path to the user at step 612.

Figure 7:
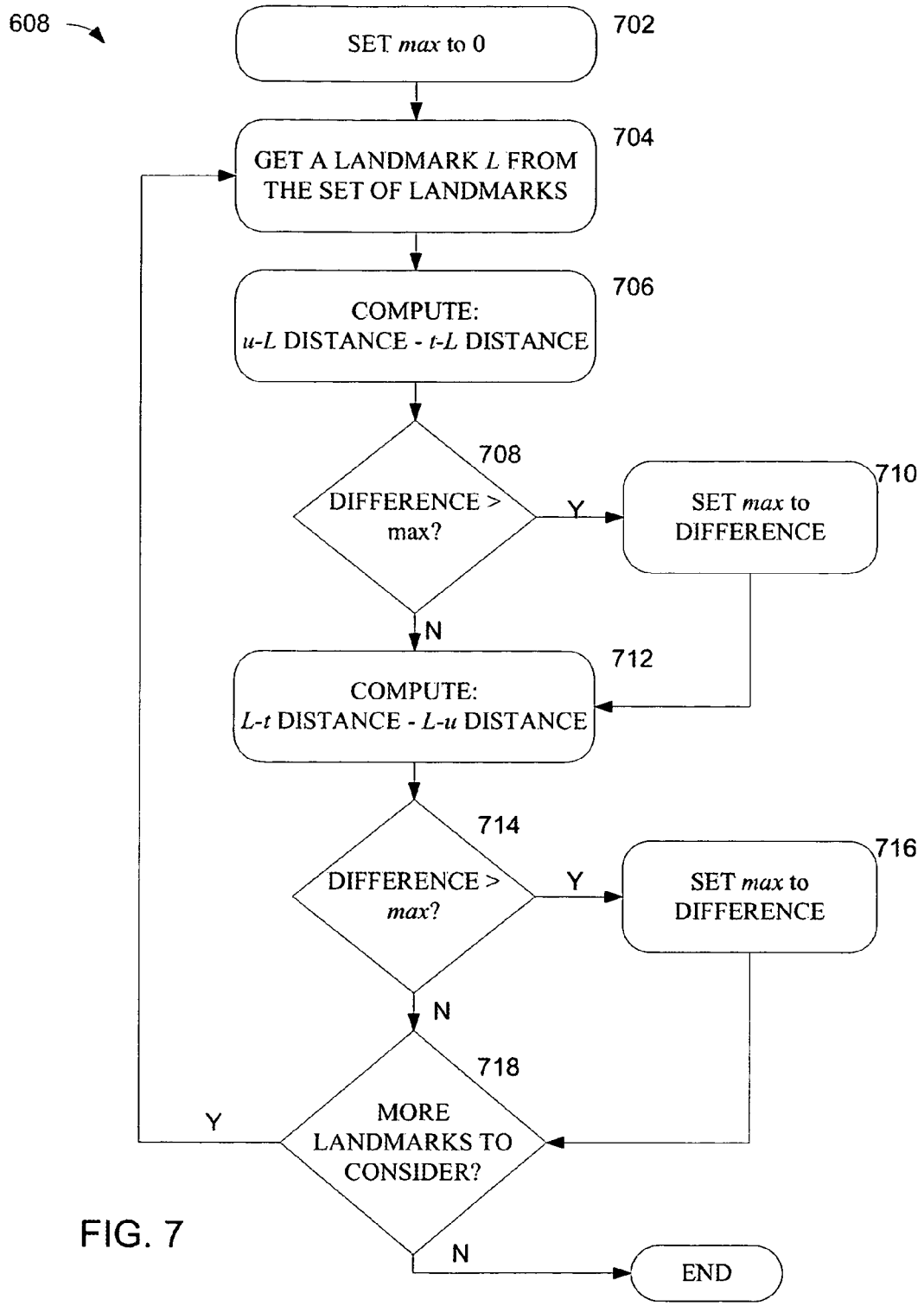
FIG. 7 is a flow diagram illustrating a method for estimating distances to a destination location using landmarks, in accordance with an embodiment of the invention.

Embodiments of the invention use distances to and from landmarks to compute lower-bound estimates on distances to the destination. Distances in graphs satisfy the "triangle inequality" (i.e., the distance of the shortest path from any vertex u to another vertex w is not greater than the sum of the shortest-path distances from u to any intermediate vertex v and from v to w), which can be used with the landmarks to produce good lower bounds as follows: Consider a landmark L. Then by the triangle inequality, the distance from u to L minus the distance from v to L is not greater than the distance from u to v. Similarly, using distances from L, then the distance from L to v minus the distance from L to u is not greater than the distance from u to v. Turning to FIG. 7, a method is described for using distances to and from landmarks to compute tight lower-bound estimates for a given destination t, in accordance with embodiments of the invention. The method computes tight lower bounds on the distance from a given vertex u to t by maintaining a max value, initially set to 0 at step 702. A landmark is selected from the set of landmarks at step 704. At step 706, the method computes the difference between the distance from u to L and the distance from t to L, and compares this difference to max at step 708. If it is larger than max, then max is updated with this value at step 710. The method then computes the difference between the distance from L to t and from L to u at step 712 and compares this difference to max at step 714. If it is larger than max, then max is updated with this value at step 716. The method checks if more landmarks are to be considered at step 718. If so, another landmark is chosen by returning to step 704. Otherwise, the method ends, and max is used as the estimated distance from u to t. The method may be repeated for each vertex in the graph.

Because the distances to and from L are pre-computed, each difference is calculated in a constant time (i.e., a fixed amount of computations, not relative to the size of the input), and the maximum difference for each vertex u can also be found in constant time if a constant number of landmarks are used. Computing lower bounds for all vertices thus takes only a linear amount of time.

Embodiments of the invention may not use all of the landmarks. This may be more efficient, since fewer computations are necessary. For a given source and destination, embodiments of the invention select a fixed-size subset of landmarks that give the highest lower bounds on the distance from source to destination. The shortest path computation is then limited to this subset when computing lower bounds.

Figure 8:
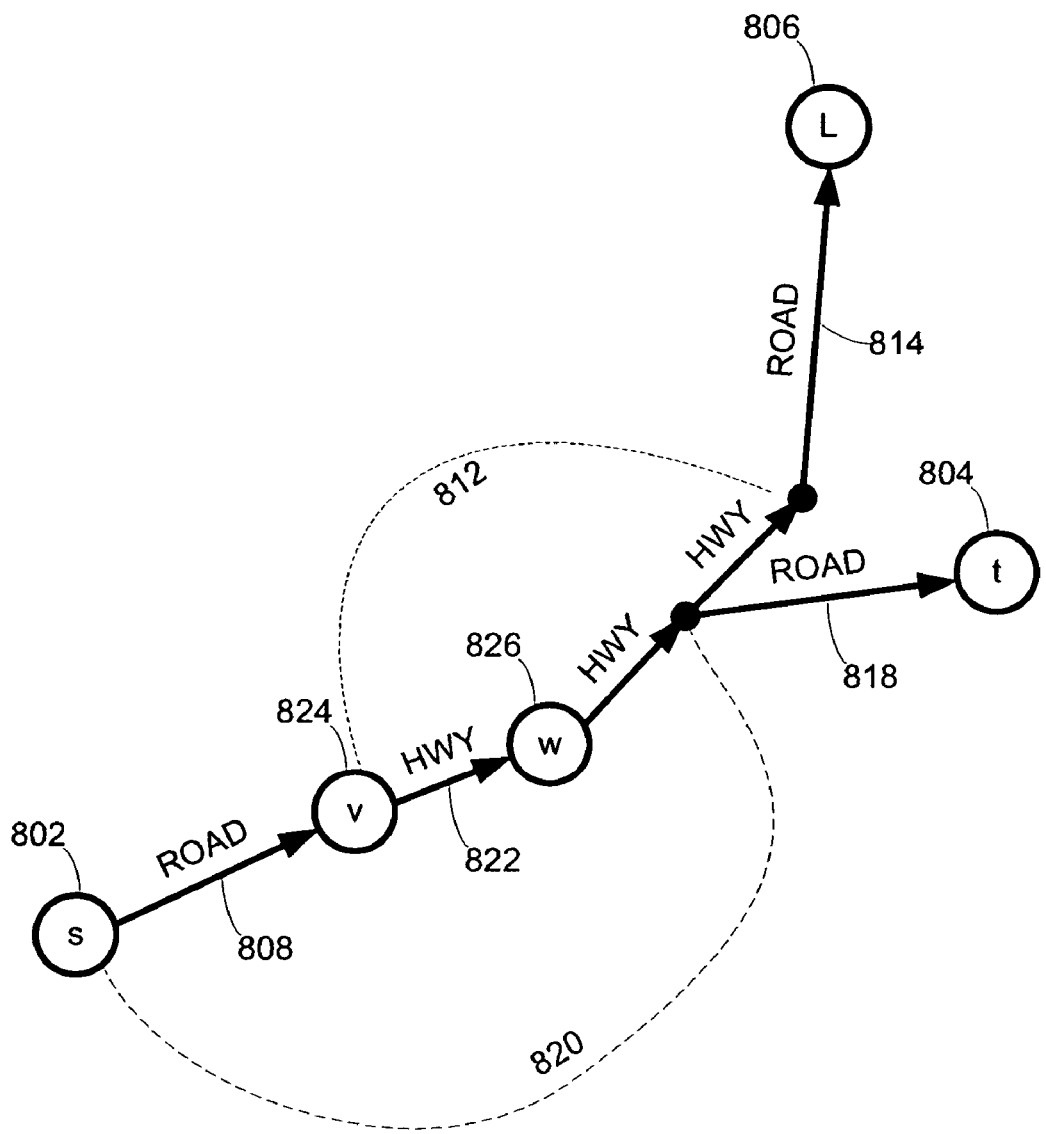
FIG. 8 is a diagram illustrating an exemplary set of locations and a landmark.

Turning attention to FIG. 8, a set of vertices and edges are shown to illustrate the effectiveness of using landmarks with an A* search, as performed by embodiments of the invention. In the example, source s 802 and destination t 804 are far from each other on the map, and a landmark L 806 is approximately between s and t. It is likely that the shortest route from s 802 to L 806 consists of a segment 808 from s 802 to a highway, a segment 812 that uses highways only, and a segment 814 from a highway to L. Furthermore, the shortest route to t 804 follows the same segment 808 to the highway and goes on the same highway path 812 for a while, but exits earlier and takes local roads 818 to t 804. In other words, for a good choice of L 806, the shortest paths from s 802 to L 806 and t 804 share an initial segment 820. Consider an edge 822 from vertex v 824 to vertex w 826 on this segment. It is easy to see that the lower bound function given by the distances to L 806 and the triangle inequality has the property that the lower bound on the distance from v 824 to L 806 is equal to the sum of the lower bound on the distance from w 826 to L 806 and the actual weight of the edge 822 from v 824 to w 826. This is true for any two vertices on the shared path segment of the shortest path from s 802 to t 804. This ensures that these edges will be the first ones scanned. In other words, if the "reduced cost" of an edge from v 824 to w 826 is defined to be the actual weight of that edge plus the potential at v 824 minus the potential at w 826, and actual weights are replaced by reduced costs, then the problem is mathematically equivalent to Dijkstra's algorithm on the new graph if the estimates are feasible.

Embodiments of the invention find good landmarks to increase the overall performance of lower-bounding methods. A simple way of selecting landmarks is to select a fixed number of landmark vertices at random. This "random method" works reasonably well. Another approach, as used in embodiments of the invention, is a farthest landmark selection algorithm, which works greedily: A start vertex is chosen and a vertex $v_1$ is found that is farthest away from it. Vertex $v_1$ is added to the set of landmarks. Vertex $v_i$ is found as the vertex which is farthest from the current set of landmarks (i.e., the vertex with maximum distance to any of the vertices in the set). Vertex $v_i$ is then added to the set of landmarks. The process repeats until the fixed number of landmarks are found. This method is called the "farthest landmark selection" method.

Another method for finding good landmarks, as used in embodiments of the invention, is a "planar landmark selection method." The planar landmark selection method generally produces landmarks that geometrically lie behind the destination, typically giving good bounds for road graphs and other geometric graphs (including non-planar graphs) where graph and geometric distances are strongly correlated. A simple planar landmark selection method works as follows: First, a vertex c closest to the center of the planar (or near-planar) embedding is found. The embedding is divided into a fixed number of pie-slice sectors centered at c, each containing approximately the same number of vertices. For each sector, a vertex farthest away from the center is chosen. To avoid having two landmarks close to each other, if sector A has been processed and sector B is being processed such that the landmark for A is close to the border of A and B, the vertices of B close to the border are skipped.

The above three selection rules are relatively fast, and are optimized in various ways in embodiments of the invention. In the optimized farthest landmark selection algorithm, for example, the method repeatedly removes a landmark and replaces it with the farthest one from the remaining set of landmarks. Another optimization technique for a given set of landmarks is to remove a landmark and replace it by the best landmark in a set of candidate landmarks. To select the best candidate, a score for each landmark is computed using a fixed sample of vertex pairs, and a landmark with the highest score is selected. For each pair in the fixed sample, the optimized method computes the distance lower bound b as the maximum over the lower bounds given by the current landmarks. Then for each candidate, the method computes the lower bound b' given by it. If b'>b, then b'−b is added to the candidate's score. To obtain the sample of vertex pairs, for each vertex, another vertex is chosen at random and the pair is added to the sample. This optimization technique can be used with the random landmark selection algorithm by replacing landmarks from sets of randomly chosen candidates. The technique can further be used to optimize the planar landmark selection algorithm by using a fixed set of candidates for each sector, where each sector is divided into subsectors, and the furthest vertex in each subsector is chosen to be a candidate. In one embodiment, the total number of candidates over all sectors is 64.

Dijkstra's method, described above, can also be run in the reverse graph (the graph with every edge's direction reversed) from the destination. The reversal of a shortest path found in the reverse graph is a shortest path in the original graph. A bidirectional version of Dijkstra's method works by alternating between running the forward and reverse version of Dijkstra's method. These versions are sometimes called "forward search" and "reverse search." During initialization, the forward search scans the source vertex s and the reverse search scans the destination vertex t. In addition, the algorithm maintains the length of the shortest path from s to t seen so far, and the corresponding path as follows: Initially, the shortest path length is set to infinity. When an edge from v to w is scanned by the forward search and w has already been scanned in the reverse direction, the shortest s-v and w-t paths and their lengths are known. If the shortest s-t path seen so far is greater than the sum of the shortest s-v and w-t paths and the weight of the edge from v to w, then a shorter path from s to t has been found, and is updated accordingly. Similar updates are done during the reverse search. The algorithm terminates when the search in one directing selects a vertex that has been scanned in the other direction.

Any alternation strategy works correctly. Embodiments of the invention use alternation strategies that balance the work of the forward and reverse searches. It can be shown mathematically that such strategies are within a factor of two of the optimal off-line strategy. Also note that a common mistake in defining the bidirectional algorithm is to assume that if the algorithm stops at vertex v, then the shortest path goes through v. This is not necessarily the case.

Figure 9:
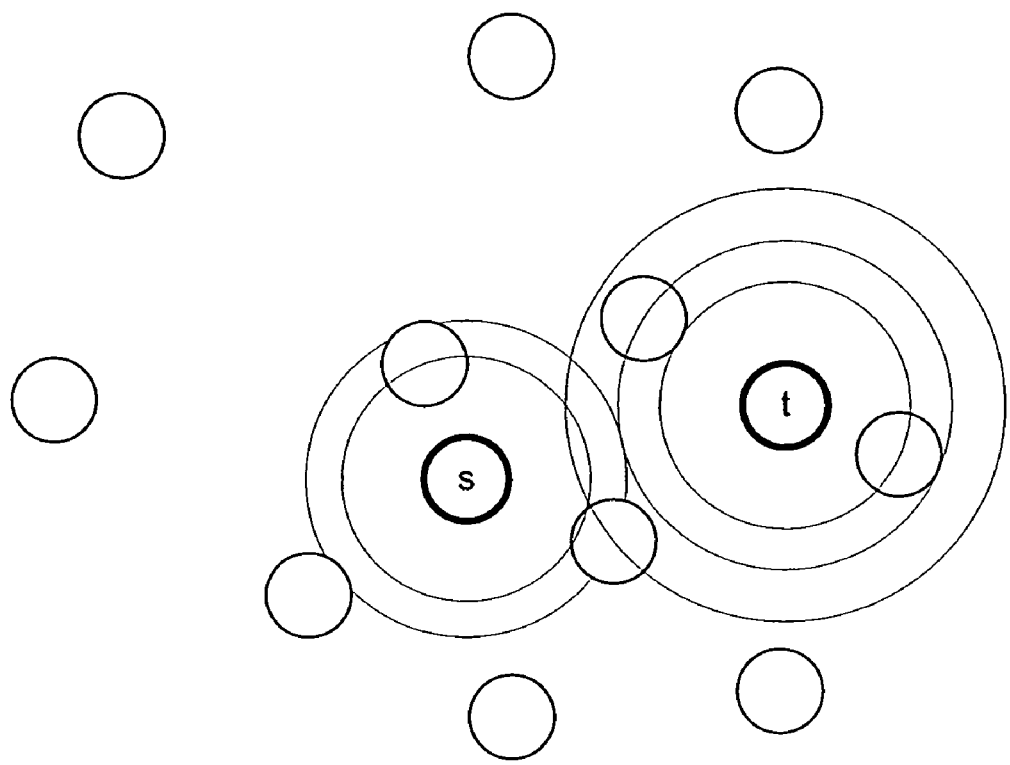
FIG. 9 is a diagram illustrating locations scanned by a bidirectional shortest path searching method, in accordance with an embodiment of the invention.

Intuitively, the bidirectional algorithm searches two touching circles centered at s and t, as illustrated in FIG. 9. To understand why this algorithm usually outperforms Dijkstra's algorithm, consider an infinite k-dimensional grid with each vertex connected to its neighbors by an edge of length one. If the s-t distance is D, Dijkstra's algorithm visits about $(2D)^k$ vertices versus $2D^k$ for the bidirectional algorithm. In this case, the bidirectional algorithm gives a factor $2^{k-1}$ speedup.

Embodiments of the present invention combine the ideas of bidirectional search and A* search. This is not a trivial task of simply running the forward and the reverse searches, stopping as soon as they meet. The forward search uses one potential function to estimate distances to the destination from vertices while the reverse search uses another potential function to estimate distances from the source to vertices. The two potential functions are "consistent" if the potential of v with respect to the source and the potential of v with respect to the destination always sum to a constant value for all vertices v. If a lower-bounding scheme uses potential functions that are not consistent, the forward and the reverse searches use different length functions, and when the searches meet, there is no guarantee that the shortest path has been found.

Two known techniques for overcoming this difficulty are to develop a new termination condition (a "symmetric" approach), or to use consistent potential functions (a "consistent" approach). The symmetric approach can use the best available potential functions but cannot terminate as soon as the two searches meet. The consistent approach can stop as soon as the searches meet, but the consistency requirement restricts the potential function choice.

A general technique for the symmetric approach is attributed to I. Pohl, who described such a search in "Bi-directional Search", *Machine Intelligence*, v.6, pp. 124-140. Edinburgh Univ. Press, Edinburgh, 1971, which is hereby incorporated by reference for all that it teaches without exclusion of any part thereof. Run the forward and the reverse searches, alternating in some way. Each time a forward search scans an edge from v to w such that w has been scanned by the reverse search, consider the concatenation of the shortest s-v path found by the forward search, the edge from v to w, and the shortest w-t path found by the reverse search. If this concatenation is shorter than best s-t path found so far, update the best path and its length if needed. Also do the corresponding updates during the reverse search. Stop when one of the searches is about to scan a vertex v whose sum of distance from s to v and estimated distance from v to t is greater than the length of the best s-t path found so far, or when both searches have scanned all the vertices. The algorithm is correct because the search must have found the shortest path by then.

Embodiments of the invention improve Pohl's symmetric approach with a symmetric lower-bounding method as follows: When the forward search scans an edge from v to w such that w has been scanned by the reverse search, paths from w are not investigated, since the shortest path from w to t is already known. This prunes the forward search. The reverse search is similarly pruned.

For a consistent approach, given a potential function p, a consistent algorithm uses p for the forward computation and −p (or its shift by a constant, which is equivalent for correctness) for the reverse one. These two potential functions are consistent; the difficulty is to select a function p that works well. One known consistent function takes the average of a first potential function and the negation of a second potential function, where the first potential function estimates distances to the destination, and the second estimates distances from the source. The average is defined to be the potential function $p_t$ for estimating distances to t. The negation of p is defined to be the potential function $p_s$ for estimating distances from s. These two functions form the pair of consistent functions used in the bidirectional A* search. Similar techniques are described by T. Ikeda et al., in "A Fast Algorithm for Finding Better Routes by AI Search Techniques," in *Proc. Vehicle Navigation and Information Systems Conference*, IEEE, 1994, which is hereby incorporated by reference for all that it teaches without exclusion of any part thereof. Embodiments of the invention further use the potential function $p_s$ to compute lower bounds on the distance between a vertex v and destination t as $p_s(t)-p_s(v)$.

Alternatively, embodiments of the invention use a maximum function rather than averaging to obtain consistent potential functions. The potential function $p_t(v)$ is defined to be the maximum value of either a first potential function estimating the distance from v to the destination t, or a second potential function difference between estimates for the distance from the source to the destination and estimates for the distance from the source to v, plus some constant value. Both values are lower bounds on the distance from v to t. Since the first potential function was specifically designed to be a lower bound on distances to t and the second potential function has been converted from a lower bound on distances from s into a lower bound on distances to t, the first potential function will be significantly bigger than the difference for vertices far away from t, in particular for vertices near source s. Therefore for vertices around s, the first potential function tends to determine the value of p and for an initial period, the forward search will behave like the one that uses that first potential function. For vertices near t, however, the distance to t approaches zero, so the second term becomes maximal. Thus for vertices around t, the reverse search behaves like the one that uses the second potential function. Choosing the constant value properly balances the two sides so that as few vertices total as possible are scanned.

Embodiments of the invention reduce the amount of storage required for a graph pre-processed in the above manner in the following way. For each vertex v, the distance to landmark L is stored, but the distance from landmark L to vertex v is not stored. Instead, the difference between these two distances is stored; the distance from L to v is reconstructed as needed by adding or subtracting the stored difference from the distance from v to L. Generally, the difference is a relatively small value, and is significantly smaller than the distance value. Therefore it requires less storage space. One embodiment uses 32 bits to represent distance to a landmark, but uses only 16 bits to represent the difference. This provides an overall savings of 25% (32 total bits rather than 48 total bits) in storage of the landmark distances. Additionally, using fewer bits to represent the data for a vertex may result in faster processing due to reduced memory throughput requirements and improved cache performance. With smaller representation, the cache is able to store more graph data at one time, and therefore may require fewer accesses to main or secondary memory.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A computer-readable storage medium comprising computer-executable instructions facilitating the finding of a shortest path from a starting location to a destination location among a set of locations, the computer-executable instructions, when executed by a computer processor, performing the steps of:
   estimating distances to the destination location from locations in the set of locations by using distances between the locations and one or more landmarks from a set of landmarks;
   selecting a first unscanned location whose sum of distance from the starting location and estimated distance to the destination location is minimal;
   computing the distance from the starting location to other unscanned locations adjacent to the first unscanned location; and
   marking the first unscanned location as scanned.

2. The computer-readable storage medium of claim 1 wherein the estimating comprises calculating the difference between:
   the distance from a first location in the set of locations to a first landmark in the set of landmarks; and
   the distance from the destination location to the first landmark.

3. The computer-readable storage medium of claim 1 wherein the estimating comprises calculating the difference between:
   the distance from a first landmark in the set of landmarks to the destination location; and
   the distance from the first landmark to a first location in the set of locations.

4. The computer-readable storage medium of claim 3 wherein the estimating further comprises:
   computing, for the first location, distance differences for each landmark in a subset of the set of landmarks; and
   estimating the distance to the destination location from the first location to be the maximal difference value over the subset of landmarks.

5. The computer-readable storage medium of claim 1 wherein the distances from a location in the set of locations to each landmark in the set of landmarks are stored in a memory with respect to the location.

6. The computer-readable storage medium of claim 5 wherein the differences between the distance from the location to each landmark and the distance from each landmark to the location are stored in a memory with respect to the location.

7. The computer-readable storage medium of claim 5 wherein the distances stored in the memory each occupies approximately 32 bits.

8. The computer-readable storage medium of claim 6 wherein the differences stored in the memory each occupies approximately 16 bits.

9. The computer-readable storage medium of claim 1 further performing the step of selecting the set of landmarks randomly.

10. The computer-readable storage medium of claim 1 further performing the step of selecting the set of landmarks using a planar landmark selection method.

11. The computer-readable storage medium of claim 1 further performing the step of selecting the set of landmarks using a farthest landmark selection method.

12. A computer-readable storage medium comprising computer-executable instructions facilitating the estimating the distance from a first location to the destination location, the computer-executable instructions, when executed by a processor, performing the steps of:
   computing a first distance from the first location to a landmark;
   computing a second distance from the destination location to the landmark;
   calculating a first difference between the first distance and the second distance for estimating the distance from the first location to the destination location;
   computing a third distance from the landmark to the destination location;
   computing a fourth distance from the landmark to the first location;
   calculating a second difference between the third distance and the fourth distance for estimating the distance from the first location to the destination location; and
   using the maximum of the first difference and the second difference for estimating the distance from the first location to the destination location.

13. A computer-implemented method of finding a shortest path from a starting location to a destination location among a set of locations, the method comprising:
   estimating distances to the destination location from locations in the set of locations by using distances between the locations and one or more landmarks from a set of landmarks;
   selecting a first unscanned location whose sum of distance from the starting location and estimated distance to the destination location is minimal;
   computing the distance from the starting location to other unscanned locations adjacent to the first unscanned location; and
   marking the first unscanned location as scanned.

14. The method of claim 13 wherein the estimating comprises calculating the difference between:
   the distance from a first location in the set of locations to a first landmark in the set of landmarks; and
   the distance from the destination location to the first landmark.

15. The method of claim 13 wherein the estimating comprises calculating the difference between:
   the distance from a first landmark in the set of landmarks to the destination location; and
   the distance from the first landmark to a first location in the set of locations.

16. The method of claim 15 wherein the estimating further comprises:
   computing, for the first location, distance differences for each landmark in a subset of the set of landmarks; and
   estimating the distance to the destination location from the first location to be the maximal difference value over the subset of landmarks.

17. The method of claim 13 wherein the distances from a location in the set of locations to each landmark in the set of landmarks are stored in a memory with respect to the location.

18. The method of claim 17 wherein the differences between the distance from the location to each landmark and the distance from each landmark to the location are stored in a memory with respect to the location.

19. The method of claim 18 wherein the distances stored in the memory each occupies approximately 32 bits.

20. The method of claim 18 wherein the differences stored in the memory each occupies approximately 16 bits.

21. The method of claim 13 further comprising selecting the set of landmarks randomly.

22. The method of claim 13 further comprising selecting the set of landmarks using a planar landmark selection method.

23. A computer-implemented method of estimating the distance from a first location to the destination location, the method comprising:
- computing a first distance from the first location to a landmark;
- computing a second distance from the destination location to the landmark;
- calculating a first difference between the first distance and the second distance for estimating the distance from the first location to the destination location;
- computing a third distance from the landmark to the destination location;
- computing a fourth distance from the landmark to the first location;
- calculating a second difference between the third distance and the fourth distance for estimating the distance from the first location to the destination location; and
- comprising using the maximum of the first difference and the second difference for estimating the distance from the first location to the destination location.

* * * * *